United States Patent

[11] 3,552,284

| [72] | Inventor | Arless B. Noble<br>Shawnee, Okla. (428 Chautauqua,<br>Norman, Okla, 73069) |
|---|---|---|
| [21] | Appl. No. | 547,400 |
| [22] | Filed | May 3, 1966 |
| [45] | Patented | Jan. 5, 1971 |

[54] PHOTOTYPESETTING APPARATUS FOR DISPLAY TYPOGRAPHY
3 Claims, 15 Drawing Figs.

| [52] | U.S. Cl. | 95/4.5 |
|---|---|---|
| [51] | Int. Cl. | B41b 13/10 |
| [50] | Field of Search | 95/4.5 |

[56] References Cited
UNITED STATES PATENTS

| 1,159,126 | 11/1915 | Stephenson | 95/1.1 |
|---|---|---|---|
| 1,798,109 | 3/1931 | Rankin | 95/4.5 |
| 2,709,952 | 6/1955 | Brock | 95/4.5 |
| 2,780,151 | 2/1957 | Borisof | 95/4.5 |
| 2,800,062 | 7/1957 | Rondthaler | 95/4.5 |
| 2,920,541 | 1/1960 | Rondthaler | 95/4.5 |
| 3,209,664 | 10/1965 | Patrick | 95/4.5 |

*Primary Examiner*—John M. Horan

ABSTRACT: A device for producing "display" typography by photographic means, also known as "photolettering." A photomatrix is fixed to the underside of a transparent member forming an indexing slide. This slide has on it a pattern of small holes corresponding lengthwise to the positions of the characters on the matrix, and transversely according to the width of the characters. The indexing slide is guided by guideways affixed to the base, which also holds and guides the paper or film. The operator sets a character by inserting the point of a stylus into the hole corresponding to the character, and moving the slide toward the center of the device, where the printing light is. The stylus moves the strip and the paper or film to a limiting point in the form of a cam stop which is disposed at an angle and the point at which the cam stop is contacted depends on the transverse position of the hole constraining its motion. Thus the appropriate advance of the film or paper is accomplished with the positioning of the character, and the exposure is then made in any suitable way.

INVENTOR: Arless B. Noble

PATENTED JAN 5 1971
3,552,284
SHEET 2 OF 2
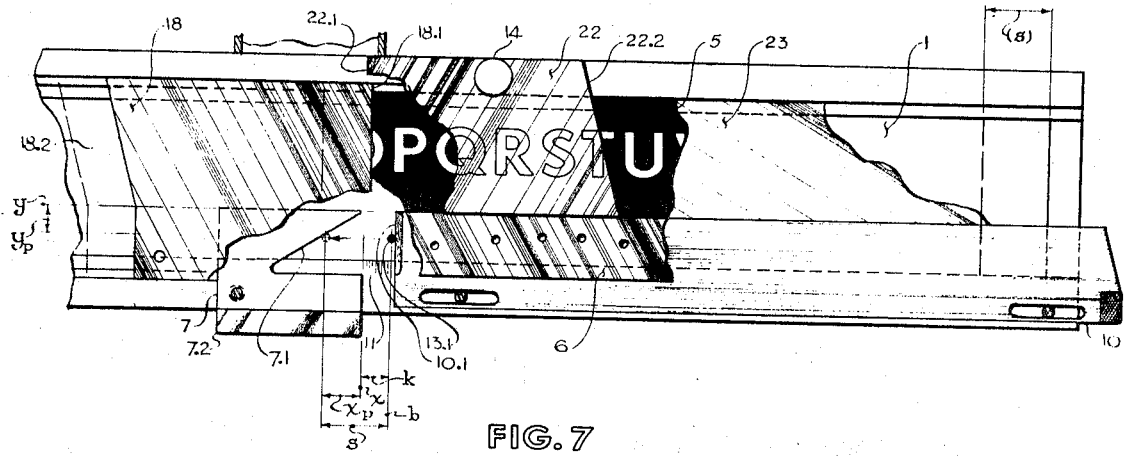
FIG. 7
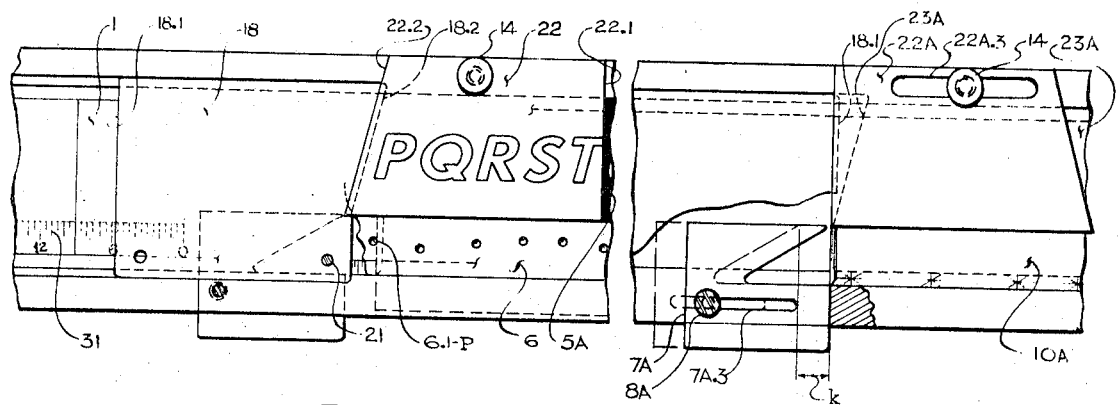
FIG. 8
FIG. 9
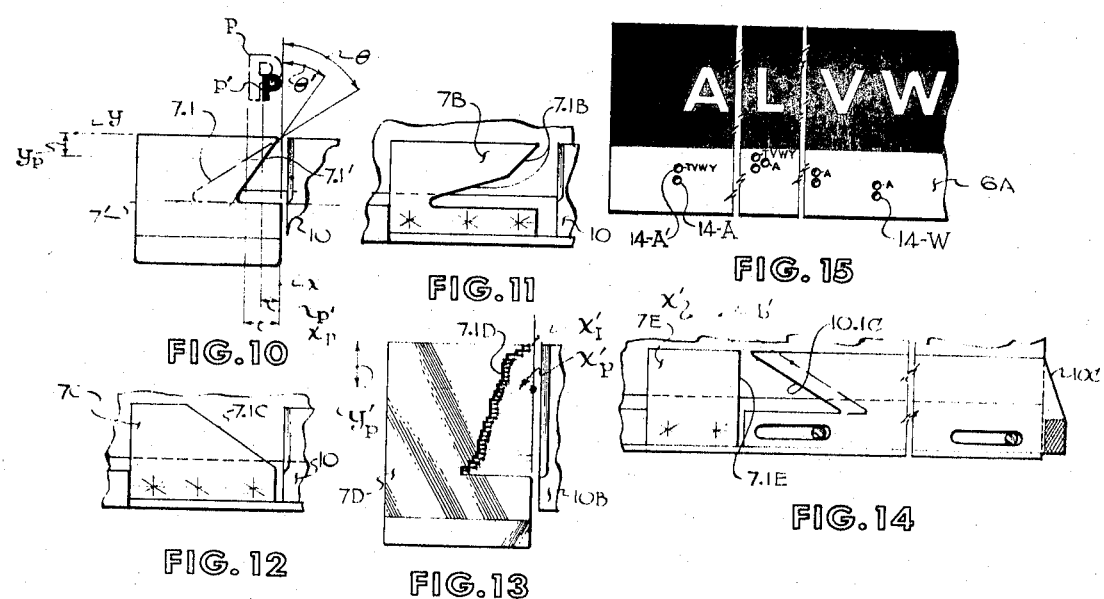
FIG. 10
FIG. 11
FIG. 15
FIG. 12
FIG. 13
FIG. 14
INVENTOR: Anders B. Noble 3,552,284

PHOTOTYPESETTING APPARATUS FOR DISPLAY TYPOGRAPHY

This invention relates to improvements in the art of producing display typography for graphic arts use by photographic means otherwise known as "photolettering." More particularly it concerns a simplification of apparatus required and introduces a novel mechanism for automatic proportional spacing of the typographical characters.

Prior devices for the purpose of this invention have either required relatively complex and expensive mechanism in order to obtain character spacing automatically or otherwise have required the operator to make somewhat tedious and difficult alignment of visual indices. Devices offering automatic letter spacing have generally required type "fonts" or photomatrices which are fairly difficult to fabricate whereas those employing visual indices have mostly used simple strips of photographic film bearing the images of a font of type. The invention described herein substantially avoids the disadvantages of both types of prior devices while obtaining the major advantages of same.

In the preferred form of the invention a photomatrix (font) is affixed to the underside of a transparent member which will be termed the "indexing slide." The indexing slide has in it a pattern of small holes corresponding lengthwise to the positions of the typographical characters in the photomatrix and transversly corresponding to the relative widths of the characters, the transverse hole locations depending proportionately from an arbitrary datum line running parallel to the row of characters comprising the "font." The indexing slide is guided by a set of ways affixed to the base of the apparatus which also is provided with a recessed channel which serves to contain and guide a strip of photosensitive material, means being provided to shield the material from ambient light. To set a character, the operator inserts the point of a stylus into the hole corresponding to a desired character and by means of the stylus thus engaged moves the indexing slide along its ways toward the center of the machine where a light source is provided. As the stylus is moved along thus it bears upon a thin supporting member interposed between the indexing slide and the strip of photosensitive material. When the stylus reaches the edge of the aforesaid bearing member near the light source it impinges upon the photosensitive strip and imparts motion to same. The assemblage of the indexing slide with its attached matrix and the photosensitive strip thus interlocked by the stylus point continue in simultaneous motion until the stylus point engages an additional thin member interposed between the indexing slide and the photosensitive material. This member will be called the "cam stop." The edge of the cam stop is disposed at an angle with the ways of the indexing slide so that it will arrest the stylus point at varying distances from the edge of the bearing strip according to the locus of its path as determined by the transverse position of the hole constraining its motion. Thus the cam stop translates position of the hole into the appropriate advance of the sensitized material and simultaneously indexes the matrix to the proper position for imprinting the desired character. The motion of the stylus may also open a shutter to provide an aperture equal in width to the character being imprinted; (this function is not essential but it allows considerable reduction in the length of the photomatrix and indexing slide).

After thus positioning the matrix and advancing the sensitized material, the operator presses a button which actuates an exposure timing device which energizes the light source to imprint the photosensitive material in a manner well known in the art. After finishing the setting of a line of typography, the sensitized material is of course developed and/or fixed as required.

Other features of the invention will become apparent from the following description thereof and from reference to the accompanying drawings: (NOTE—For the sake of clarity the following convention is used in the drawings: where the photomatrix is completely unobscured it is shown in solid as it actually appears to the operator; where it is shielded from actinic light but is visible to the operator, the characters are shown in outline.)

FIG. 7 is a partial plan view, being the same view as FIG. 2 except some parts are omitted and others broken out to better illustrate the character indexing means.

FIG. 8 is a partial plan view showing the rearrangement of certain parts to facilitate the setting of oblique or italic type faces.

FIG. 9 is a partial plan view showing alternative forms and arrangement of certain cooperating parts.

FIG. 10 is a partial view showing how changeable cam stops having different edge angles may be employed for setting different sizes of a given type style with the same pattern of indexing holes.

FIG. 11 is a partial view showing a modified form of the cam stop having a compound edge.

FIG. 12 is a partial view showing that the edge angle of the cam stop may be inverted.

FIG. 13 shows an alternative form of a changeable cam stop with discretely stepped edge geometry coordinated to a particular type face so that the same indexing hole pattern may be employed for differing type styles.

FIG. 14 is a partial plan view of an alternate form which illustrates that the functional edge geometry may be applied to the bearing strip and a simple fixed stop used in place of the cam stop.

FIG. 15 is a partial and fragmented view of a modification of the indexing slide, photomatrix assembly showing auxiliary indexing holes used for "kerning."

Figure 1:
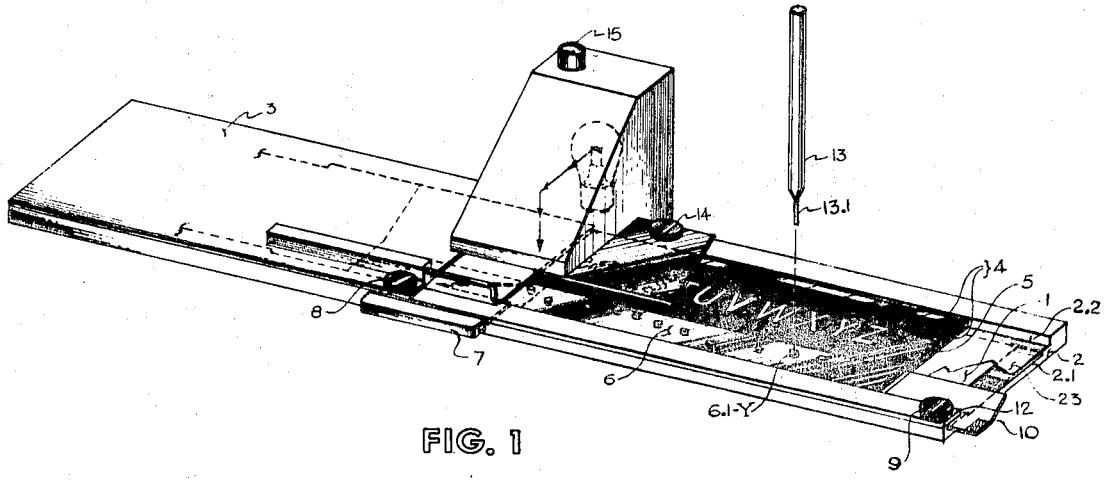
FIG. 1 is a pictorial (dimetric) view showing the preferred form of the apparatus.
Figure 2:
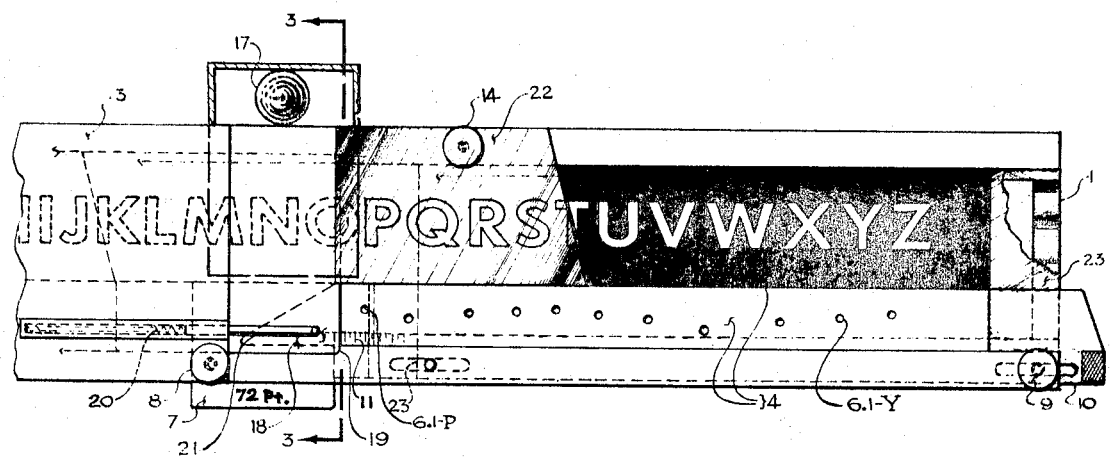
FIG. 2 is a partial plan view with part of the light source assembly removed for clarity.

Referring to the drawings:

In FIG. 1 the general appearance of the presently preferred devices can be seen. In FIG. 2 the central and right-hand end of the device are shown in plan view to somewhat larger scale with part of the light source assembly deleted for clarity.

The manner of using the device will first be explained and the details of mechanism and function will subsequently be described.

The manner of using the device can be understood most easily by referring to FIGS. 1 and 2 jointly. The operator begins by inserting a strip of sufficient length to reach approximately to the right-hand edge of the cover 3. He then selects a slide-font 4 having the desired type face on its photomatrix 5. (The slide-font may be either a separable assembly comprised of a photomatrix and an indexing slide 6, or it may be an integral unit with the matrix imprinted permanently on a downward projecting land on the lower face of the indexing slide, depending alternative modes later described.) The operator then ascertains whether the proper cam stop 7 for the size type on the matrix in the machine. If not, he may remove the cam stop by loosening thumbscrew 8 and insert the proper cam stop. Next he loosens thumbscrew 9 which permits the bearing strip 10 to be shifted longitudinally. This adjustment determines the amount of space which will appear between letters; a short scale 11 (FIG. 2) may be provided to facilitate this. The slide-font is now inserted into its way 2.2 and 12. If the type face to be set is vertical or roman this completes the setup of the machine; if oblique or italic type is used, a rearrangement of certain parts is required which will be explained in reference to FIG. 5.

The operator now inserts the point of a stylus 13 into an indexing hole, say 6.1-Y, corresponding to the character (Y) he desires to imprint. The slide-font is then moved (as described previously) in the direction of the center of the machine. As the stylus nears the edge of the bearing strip 10 a downward pressure is exerted on the stylus point and the motion continued until the stylus is arrested by the edge of the cam stop 7 within the machine. With the stylus in this position the operator then depresses the button 15, which actuates a timing device 16 (FIG. 3) which in turn energizes the light source 17 to imprint the selected character onto the photosensitive material 1. The operator then releases pressure on the stylus point and either withdraws it from the slide-font or he may use the stylus as a convenient means to return the slide-font to a suitable position for selecting the next character. The operation is continued in this way until the desired composition has been set whereupon the slide-font may be withdrawn and the stylus used in the central aperture (formed by the edges of the bearing strip and cam stop) to advance the photosensitive material until it emerges from the far end of the machine whereupon it may be withdrawn and developed in the conventional manner. (It is of course obvious that the cover of the machine may be made removable to facilitate removal of the exposed material.)

Before proceeding to a discussion of the subsequent FIGS. the function of the shutter should be explained as this can be seen in FIGS. 1 and 2. (See also FIG. 7). When not being actuated, the shutter 18 is held in position against a boss 19 by the force of compression spring 20 which is transmitted by pushrod 21. Examination of the drawings will show that as the stylus point approaches the cam stop it first engages the right-hand edge 18.1 of the shutter. The motion of the stylus thus causes the shutter to slide in its ways and open an aperture between same and the auxiliary shield 22. The aperture, so formed will vary in proportion to the width of the letter being set. The shutter is not a necessary feature of the invention if the light source is enclosed as shown but it will be seen to permit the use of shorter photomatrices than if a fixed aperture is used. (In the case of a fixed aperture the spacing of the characters on the matrix is governed by the width of the widest character.) Similarly, the feature of the auxiliary shield will be seen later to permit a shortening of photomatrices having oblique or italic type styles.

The auxiliary shield 22 augments the function of the mask 23 which is to protect the photosensitive material 1 from exposure to ambient light. The shield 22 is made from material which is visually transparent but actinically opaque in order to avoid obscuring the photomatrix. (A suitable material for use with ordinary orthochromatically sensitive silver halide emulsions is transparent red acrylic plastic.) It is advantageous to have the cover 3 made from a similar material so that the operator may see the length of copy he has set.

Figure 3:
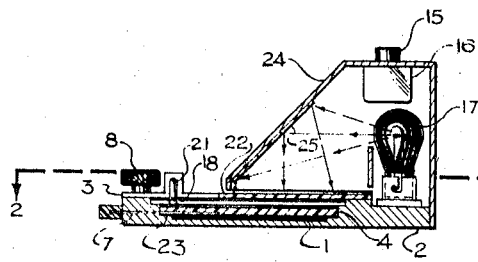
FIG. 3 is a transverse section (rotated 90°) taken near the middle of the device showing the light source assembly and the vertical relationship of other parts.

In FIG. 3 is shown one suitable arrangement of the light source and its associated components. It is convenient to contain the light source 17 and the timing device 16 in a single enclosure such as lamphouse 24. An additional feature which may be included is reflector 25 which affords adequate distance between the light source and the matrix within a compact enclosure. This configuration allows the lamphouse to be sloped away from the area of the cam aperture and thus provide good clearance for the stylus and the operator's fingers. Adequate light source distance is desirable both for evenness of exposure and sharpness of the shadow image cast by the matrix. For the latter, the light source should also be as small as practicable. If an incandescent lamp is used the bulb should be of the clear (rather than frosted) variety and the filament should be as compact as possible. A suitable exposure timing device is a delayed action switch of the well known pneumatic variety, wherein the contacts are closed by momentary pushing of a button and reopening of the contacts is delayed by a dashpot. The dashpot should have a variable orifice so that the exposure time may be adjusted.

Figure 4:
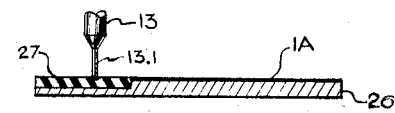
FIG. 4 is a sectional view illustrating the use of a transport slide to carry the photosensitive material without direct engagement of that material by the stylus.
Figures 5, 6:
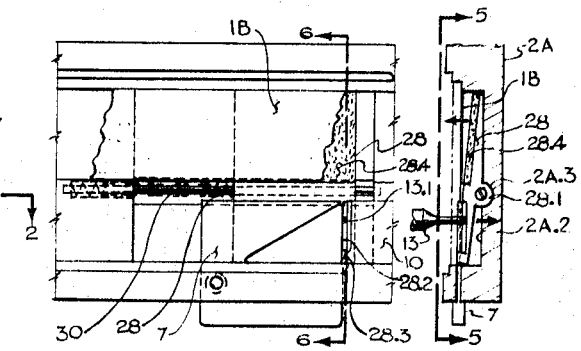
FIG. 5 is a partial plan view of an alternative means of advancing the photosensitive material employing a reciprocating pressure pad actuated by the stylus. Some parts being the same as in the previous views are omitted for clarity.
FIG. 6 is a transverse sectional view of the alternate means shown in FIG. 5 particularly indicating the vertical rocking action of the reciprocating pad.

FIGS. 4, 5, and 6 demonstrate that in alternative forms of the invention the stylus may not impinge directly upon the sensitized material but rather impart motion to same through the agency of additional means. Either of these versions may be indicated in the case of a machine designed to set very large type where it may be desired to conserve the area of the sensitized material otherwise used in indexing.

The means shown in FIG. 4 consists of a transport slide 26 which serves as a relatively rigid substrate for the sensitized material. The other parts of the device have not been shown in FIG. 4 because they may be essentially the same as previously shown. The slide will conveniently have a strip of frictional surface 27 bonded to it where the stylus impinges. The engagement is found to be more positive if the frictional surface is slightly resilient; it should have good elastic recovery so that impressions of the stylus point will not interfere with reuse. Although some form of clip may be suggested for attaching the photosensitive material, the use of a pressure sensitive adhesive on the slide has been found adequate. Most materials require only a small area at each end of the slide. Disposable slides, e.g. made of card stock), have also been used. If the transport slide is made sufficiently thin it may be used in the same channel (2.1) provided for the photographic material generally used, which has a rather heavy waterproof paper base. The slide is then very useful for carrying thin-base films and papers which are too flimsy to track well in the channel.

FIGS. 5 and 6 set forth a reciprocating feed mechanism for advancing the photosensitized material. The specific mechanism shown is representative of a general class of reciprocating means which engage the material to be fed when moving in the direction of feed and disengage same during a return stroke in the opposite direction. The operation is as follows: the pressure pad 28 is located below the plane of the photographic material in a recess 2A.2 in the base 2A. A downward semicylindrical projection 28.1 of the pad extends into a mating groove 2.C in the floor of the recess thus defining an axis constraining movement of the pad to longitudinal translation with slight rotation. The upper face of the pad is provided with a shallow groove 28.2 for engaging the stylus and, aligned with the groove, a low projecting boss 28.3 to intercept the edge of the bearing strip 10. When unactuated the pad is held in position as shown with the boss against the edge of the bearing strip by the force of a compression spring 29. A guide rod 30 provided for the spring also retains the pad in the recess. The pressure pad may also be provided with a resilient facing 28.4. When the stylus engages the groove 28.2, pressure applied by the operator causes the pad to rotate about the aforesaid axis bringing the resilient facing to bear against the underface of the photosensitive strip 1B forcing same into contact with the photomatrix on the font-slide and the pressure pad during the indexing travel of the stylus; since the slide-font and pad move concurrently the photosensitive material is advanced accordingly. On the withdrawal of the stylus the pressure pad rotates in the opposite sense, thereby releasing the photosensitive material, and is returned by the spring, leaving the photosensitive strip advanced the required amount.

The means of indexing the type matrix and advancing the photosensitive material can be seen in considerable detail in FIG. 7 which refers to the preferred embodiment. In this form the indexing holes of the indexing slide depend proportionately in the transverse direction from datum line y in accord with the widths of the corresponding typographical images; the ratio of proportion depending on the slope of the cam stop edge 7.1. A line paralleling edge 7.1 and offset by half the thickness of the stylus point will intersect the datum y in a point through which a second datum x, orthogonal to y, passes. Datum x defines the origin of longitudinal displacements of the stylus point when motion of same is arrested by the edge 7.1 of the cam stop. For example: the stylus point 13.1 appears in FIG. 7 in the position it occupies when inserted in the indexing hole corresponding to the letter "P" of the matrix and beginning its engagement of the photosensitive strip. In this position the stylus point depends a distance $y_p$ from the datum $y$ giving rise to a displacement $x_p$ from datum $x$ when the stylus stroke is arrested by the point striking the cam stop edge. This displacement is precisely equal to the width of the letter P.

However, it will be seen that the total distances through which the stylus point is engaged with the photosensitive strip is somewhat greater than $x_p$ by an amount $k$ measured from a baseline $b$ passing through the stylus center at the beginning of the engagement. The position of the baseline $b$ is determined by the edge 10.1 of the bearing strip 10 and thus may be shifted by the adjustable feature of the bearing strip. The distance $k$ is the intercharacter space, or "lettering spacing" as it is generally known to printers; $k$ is usually left at a fixed value for a given piece of composition. It will also be seen that, although the photosensitive paper is engaged through a distance $s$, the shutter aperture opens only a distance equaling $x_p$ as the edge 22.1 of the shield 22 is aligned with datum $x$; this feature is provided to avoid imprinting a portion of an adjacent matrix character when the operator is setting to wide letter spacing.

FIG. 8 shows a feature of the preferred embodiment whereof the shutter 18 and the auxiliary shield 22 may both be reversed endwise to bring a set of oblique edges together. This is accomplished by removing thumbscrew 14 and disengaging pushrod 21 from the shutter, then removing the shield, after which the shutter may be lifted out; the shield and shutter are turned over and the parts replaced. When this is done the shutter will open to form an oblique (parallelogram-shaped) aperture rather than an orthogonal (rectangular) one. This aperture shape is better suited to the use of italic or oblique type. If a rectangular aperture is used for an oblique character it must open to the width of the orthogonal projection of that character and accordingly greater space is required between the matrix images and consequently longer matrices. Also, since many oblique types correspond closely to related vertical styles in character widths (if the oblique types are projected obliquely; indeed many slant versions are obtained from the vertical directly by optical means), the use of an oblique aperture will often permit the identical indexing hole pattern to be used for both versions.

Another feature shown in FIG. 8 is the inclusion of a pica scale 31. This is conveniently placed on the floor of the channel guiding the photosensitive strip; if a visually transparent (actinically opaque) cover is provided, the scale, as well as the strip, can be seen through it. The utility of the pica scale is found when it is necessary to set a line to measure. This is done by first making a "blind" setting of the line (without exposure) to determine the unjustified length of same; then the line is actually set while making adjustments in the interword spaces by means of the pica scale, or the adjustments may be made in the letter spacing by resetting the bearing strip.

FIG. 9 demonstrates that the letter spacing adjustment may also be had by providing longitudinal adjustment of the cam stop whereas the bearing strip 10A may be fixed. For this purpose a slot 7A.3 is provided in the cam stop 7A. The cam stop handle 7.2A prevents rotation by nesting against the edge of the machine base. It should be noted that the bearing strip 10A may actually be merely a thickened portion of the mask 23A or may in fact be dispensed with if the operator uses appropriate technique: he must avoid excessive pressure which might damage the thin mask so long as the stylus point is over same; after insertion of the stylus point he moves the slide-font until the stylus contacts the edge 18.1 of the shutter, at this point he applies full pressure for engaging the photosensitive strip and completes the stroke. The auxiliary shield is also provided with a slot 22A.3 to allow longitudinal adjustment to prevent unwanted exposure of adjacent matrix images when type is being set to wide letter spacing.

If the machine is provided with a set of interchangeable cam stops having different edge slopes (or equivalently, an adjustable cam stop), a considerable advantage is obtained in that the same pattern of indexing holes may be used for all point sizes of a given type style provided only that the image positions correspond lengthwise on the matrices for various sizes. This can be readily seen by reference to FIG. 10 where the same transverse displacement $y_p$ (of FIG. 7) gives here the smaller longitudinal displacement $x_p'$ corresponding to the width of the smaller character P′, the larger character P and its corresponding cam edge being shown in dashed lines for comparison. The relationship will readily be seen to be:

$$x_D' : x_D :: \tan \theta' : \tan \theta$$

It is interesting to note that with this system that an error in the transverse position of an indexing hole will be reflected in the longitudinal displacement directly in proportional to the point size of the type being set, resulting in a smaller error for smaller type.

FIG. 11 shows a fixed cam stop 7B having a compound edge geometry which might be used in a simplified machine. In this system the indexing patterns of smaller type faces would be wholly intersected by the upper segment of the cam edge having the steeper slope facilitating the greater accuracy of spacing required for small type. In the same instance, the lower segment having the lesser slope gives the cam stop sufficient range to operate with larger point sizes.

FIG. 12 shows another form of the cam stop 70 whereon the edge 7.10 has been inverted from that described above. Here is is necessary to invert the scheme of transverse hole locations; i.e. the datum must be located near the bottom edge of the indexing slide and the hole displacements measured upwards in an equivalent manner.

FIG. 13 illustrates an alternate concept in the interaction of the indexing hole pattern and the cam stop. This forms the basis for an embodiment in which the indexing holes may be said to encode the symbolic identities of the matrix characters (i.e. the symbol independently of the typographical style, or case, etc.) rather than the respective widths of the images. The information as to the widths is then encoded by the edge geometry 7.1D of the cam stop 7D. The edge geometry will in general either show steplike discontinuities or complex curvature. In practical terms this means that a certain transverse position is assigned to each symbol normally occuring in a font of type (which may be the same for both upper and lower case) and this same pattern may be used with any type style or size. Each type font (in the sense of being differentiated by point size and case as well as style) then requires a special cam stop encoding its particular character widths.

The particular scheme illustrated in FIG. 13 assigns the positions in the usual order of increasing widths as found in most (but not necessarily all) type styles, beginning with the letter "1" at the top. If this is done the successive positions need differ by only half of the stylus point thickness (although occasional interferences may result with unusual type designs necessitating a change either in the order of the characters on the matrix or in the order of hole positions).

If the two systems of assigning transverse hole positions (that is: firstly, as a function of image widths, and secondly, as an encoding of symbol indentities) are looked at from the mathematical point of view they will be seen to be special cases of a more general scheme wherein the hole positions may be assigned in a completely arbitrary manner except for the sole limitation that no two holes shall be assigned the same position unless (all) the character images corresponding thereto are of equal width. If this rather loose requirement is fulfilled a cam edge geometry can always be devised which will combine transformally with the hole position scheme to yield unambiguously the required displacements equaling the image widths to suit a given font of characters. (Physically, of course, if two hole positions are too close the stylus point may have to be impracticably thin in order to discriminate between them.)

If the symbol encoding system is used it is likely desirable to advance the photosensitive material by indirect means as disclosed in FIGS. 4, 5, and 6 in order to conserve material.

FIG. 14 illustrates the possibility of a partial inversion of the functions of the bearing strip 10C and the cam stop 7E wherein the differentiating geometry is invested in the edge 10.1C of the bearing strip, (which by analogy might be retermed the "bearing-cam"). One might say that this is not actually an "inversion of functions" as one may regard it simply as a rotation of datum $x$ to the position $x'$ and regard the "displacements" as relative to $x'$. In any case it is felt to be a purely equivalent form.

FIG. 15 illustrates a refinement of the indexing slide 6A to allow "kerning" of letters. It is well known among typographers that if characters are spaced strictly according to width certain combinations of letters appear to be improperly spaced. This effect arises from the shapes of some letters and is particularly troublesome in the setting of copy entirely in the upper case, especially if the type size is large. A substantial alleviation of this problem is possible by providing the most troublesome letters with one or more auxiliary indexing holes so that the spacing of same may be varied. In the partial view in the FIG. some of the more troublesome letters are shown with the auxiliary indexing holes (such as 14-A') indicated by small letters and leaders such as might appear on such a slide. The scheme shown has the auxiliary holes provided on the basis of the following letter; that is, the auxiliary hole is used when it bears a label corresponding to the next letter following that being set. An analogous scheme can be devised based upon the preceding letter. The simplest technique for using the system shown is to first advance the photosensitive strip with the normal (unlabeled) indexing hole and expose the character, then the photosensitive strip is returned with the stylus to its former position whereupon the stylus is inserted in the auxiliary kerning hole indicated and the strip is reindexed (without exposure); it is then in position for the following letter to be set in the normal manner (unless it again is followed by a letter requiring kerning). Of course the strip could be advanced with the kerning hole and the exposure made then by moving the auxiliary shield to allow complete exposure of the letter; however, the above technique has been found to be quickest and easiest.

Ideally there might be provided a kerning hole for each combination of letters except that this would require 26 indexing holes for each character (676 total) if only upper case letters were accommodated This would appear impractical as in actual practice many holes would overlap by large portions of their diameters which taken with the necessary clearance required for inserting the stylus point would result in considerable indeterminancy. This is not to say that it cannot be done by a strategy such as using a very steep cam edge slope to spread the hole positions; another device is the offsetting of holes such as the case of the hole labeled "A" located under the letter "L" in the FIG. If the latter is done there must be a "standard" hole in the configuration so that the character may be positioned correctly for exposure as above before readvancing the sensitized strip with the offset kerning hole.

A preferred embodiment of this invention based upon a particular case chosen from a generalized but well defined class of schemata usable for conveying information of matrix image widths by mechanical means involving perforations of an indexing slide arrayed to interact transformally with the geometry of a caming edge to yield said image widths has been set forth with modifications and substitutions of parts and subcombinations thereof described. Certain equivalencies have also been described whereof others are believed implied and obvious.

A second case drawn from the aforesaid schemata is also set forth as the basis of an alternative embodiment giving rise to analogous modifications and substitutions of parts and subcombinations thereof as set forth in detail in the preferred embodiment.

I claim:

1. A phototypesetting device of the class employing a striplike photomatrix element from which characters are imprinted by a light source onto a strip or sheet of photosensitive material wherein an improvement in means of positioning the imprinted images comprises the following features: a photomatrix attached to an elongated, relatively inflexible indexing slide constrained by ways to longitudinal motion, said indexing slide having therein a pattern of indexing perforations or holes in positions corresponding longitudinally to those of the several typographical character images of the photomatrix but varying transversely in accordance with a chosen scheme which associates a transverse position with each character image of the photomatrix, said scheme may be arbitrary within the limitation that no two holes shall be assigned the same transverse position unless the corresponding characters are of equal width; a moveable stylus point, insertable into said indexing holes, whereby the possible motion of said stylus point is constrained to a particular longitudinal path as determined by the particular hole in which it is engaged; cam stop means intercepting the field of possible paths of and capable of arresting the motion of the stylus point, the functional edge of said cam stop having such form as required by the aforesaid scheme of transverse positions to associate and provide a differing longitudinal displacement of the arrested position of the stylus point for each transverse position of the indexing holes, said displacements differing from a datum by distances equaling the widths of the respective characters associated with the various indexing holes; means to impart travel of the stylus point to the strip of photosensitive material beginning at a baseline paralleling the aforesaid datum with means to shift said baseline from coincidence with said datum by an increment equaling a desired intercharacter spacing whereby the matrix is simultaneously positioned for imprinting of a particular character and the photosensitive material is advanced an amount equaling the width of said character plus a preset intercharacter space.

2. A phototypesetting device of the class employing a striplike photomatrix element from which characters are imprinted by a light source onto a strip or sheet of photosensitive material wherein an improvement in means of positioning the imprinted images comprises the following features: a photomatrix attached to an elongated, relatively inflexible indexing slide constrained by ways to longitudinal motion, said indexing slide having therein a pattern of indexing perforations or holes in positions corresponding longitudinally to those of the several typographical character images of the photomatrix but varying transversely in accordance with a chosen unambiguous function relating various transverse displacements from an arbitrary datum to various character widths, each indexing hole being assigned a transverse position associated with the width of its corresponding photomatrix character; a moveable stylus point, insertable into said indexing holes, whereby the possible motion of said stylus point is constrained to a particular longitudinal path as determined by the particular hole in which it is engaged; cam stop means intercepting the field of possible paths of and capable of arresting the motion of the stylus point, the functional edge of said cam stop having such form as required by the aforesaid function of character widths to associate and provide a differing longitudinal displacement of the arrested motion of the stylus point for each transverse position of the indexing holes, said displacements differing from a datum by distances equaling the widths of the respective characters associated with the various indexing holes; means to impart travel of the stylus point to the strip of photosensitive material beginning at a baseline paralleling the last said datum with means to shift said baseline from coincidence with that datum by an increment equaling a desired intercharacter spacing whereby the matrix is simultaneously positioned for imprinting of a particular character and the photosensitive material is advanced an amount equaling the width of said character plus a preset intercharacter space.

3. A phototypesetting device of the class employing a striplike photomatrix element from which characters are imprinted by a light source onto a strip or sheet of photosensitive material wherein an improvement in means of positioning the imprinted images comprises the following features: a photomatrix attached to an elongated, relatively inflexible indexing slide constrained by ways to longitudinal motion, said indexing slide having therein a pattern of indexing perforations or holes in positions corresponding longitudinally to those of the several typographical character images of the photomatrix but varying transversely in accordance with a chosen scheme of positional encoding of the symbolic identities of the photomatrix characters, said encoding scheme unambiguously associating a particular transverse position with each particular symbolic identity, whereby each indexing hole is given a transverse position determined by the identity of its corresponding character; a movable stylus point, inserted into said indexing holes, whereby the possible motion of said stylus point is constrained to a particular longitudinal path as determined by the particular hole in which it is engaged; cam stop means intercepting the field of possible paths of and capable of arresting the motion of the stylus point, the functional edge of said cam stop having such form as required by the aforesaid scheme of transverse positions to associate and provide a differing longitudinal displacement of the arrested position of the stylus point for each transverse position of the indexing holes, said displacements differing from a datum by distances equaling the widths of the respective characters associated with the various indexing holes; means to impart travel of the stylus point to the strip of photosensitive material beginning at a baseline paralleling the aforesaid datum with means to shift said baseline from coincidence with said datum by an increment equaling a desired intercharacter spacing whereby the matrix is simultaneously positioned for imprinting of a particular character and the photosensitive material is advanced an amount equaling the width of said character plus a preset intercharacter space.